United States Patent
Watanabe

(10) Patent No.: US 8,158,075 B2
(45) Date of Patent: Apr. 17, 2012

(54) ETCHING SOLUTION REPRODUCING APPARATUS AND ETCHING SOLUTION REPRODUCTION METHOD

(75) Inventor: Hiroshi Watanabe, Kanagawa-ken (JP)

(73) Assignee: Chemical Art Technology Inc., Kanagawa (JP)

( * ) Notice: Subject to any disclaimer, the term of this patent is extended or adjusted under 35 U.S.C. 154(b) by 520 days.

(21) Appl. No.: 11/936,316

(22) Filed: Nov. 7, 2007

(65) Prior Publication Data

US 2009/0049653 A1 Feb. 26, 2009

(30) Foreign Application Priority Data

Aug. 20, 2007 (JP) ................. 2007-213768

(51) Int. Cl.
C02F 1/52 (2006.01)
B01D 9/02 (2006.01)
C23F 1/46 (2006.01)
B01D 37/00 (2006.01)
C23F 1/00 (2006.01)

(52) U.S. Cl. ....... 422/245.1; 23/299; 210/348; 210/709; 210/712; 210/737; 210/767; 216/2; 261/78.1

(58) Field of Classification Search ................ 261/78.1
See application file for complete search history.

(56) References Cited

U.S. PATENT DOCUMENTS

| | | | |
|---|---|---|---|
| 6,399,517 B2 * | 6/2002 | Yokomizo et al. | 438/745 |
| 6,583,071 B1 * | 6/2003 | Weidman et al. | 438/787 |
| 2001/0040135 A1 * | 11/2001 | Taira et al. | 210/763 |
| 2002/0001967 A1 | 1/2002 | Yokomizo et al. | |
| 2002/0102851 A1 | 8/2002 | Yokomizo et al. | |
| 2004/0200806 A1 * | 10/2004 | Izuta et al. | 216/99 |

FOREIGN PATENT DOCUMENTS

| | | | |
|---|---|---|---|
| JP | 2001-23952 | | 1/2001 |
| JP | 2003-224106 | | 8/2003 |
| JP | 2003224106 A | * | 8/2003 |

OTHER PUBLICATIONS

English language Abstract of JP 2003-224106.
English language Abstract of JP 2001-23952.

* cited by examiner

*Primary Examiner* — Stanley Silverman
*Assistant Examiner* — Syed Iqbal
(74) *Attorney, Agent, or Firm* — Greenblum & Bernstein P.L.C.

(57) ABSTRACT

This invention intends to enable silicon compound to be removed from waste etching solution at a high removal rate and waste etching solution to be recycled without disposing it. The etching solution reproducing apparatus includes: temperature adjusting means for adjusting the temperature of taken out waste etching solution; atomizing means for atomizing waste etching solution adjusted in temperature by the temperature adjusting means; precipitating means for collecting waste etching solution atomized by the atomizing means and precipitating silicon compound in the waste etching solution; and separating means for separating silicon compound precipitated from the waste etching solution by the precipitating means so as to obtain reproduced etching solution.

5 Claims, 4 Drawing Sheets

CONVENTIONAL ART (ETCHING APPARATUS)

ETCHING SOLUTION REPRODUCING APPARATUS AND ETCHING SOLUTION REPRODUCTION METHOD

BACKGROUND OF THE INVENTION

1. Field of the Invention

The present invention relates to an etching solution reproducing apparatus for reproducing waste etching solution after wet etching treatment and an etching solution reproduction method.

2. Description of Related Art

The wet etching is an art for removing film formed on a substrate using chemical dissolution action of etching solution and has been used in various kinds of technical fields. Particularly in field of semiconductor, it has been used as an art for processing the shape of thin film on a semiconductor such as wafer and removes unnecessary thin film by etching after thin film such as oxide film is formed on a semiconductor wafer so as to form a pattern with photo resist. When producing a semiconductor device on a silicon wafer, phosphoric acid aqueous solution heated at 150 to 175° C. is used as the etching solution in a process for removing silicon nitride film from a silicon wafer on which the silicon nitride film ($Si_3N_4$) and silicon oxide ($SiO_2$) are formed.

FIG. 1 is an explanatory diagram showing a conventional art of the etching apparatus described in the Japanese Patent No. 3842657. Its basic configuration includes a structure for circulating etching solution consisted of phosphoric acid aqueous solution ($H_3PO_4+H_2O$) within an etching bath 1. The etching bath 1 includes two-bath (external/internal) structure constituted of an internal bath 1A having a volume capable of accommodating plural pieces of silicon wafers W vertically in parallel and provided with a heater 1H on its side portion and an overflow bath 1B formed to surround the outer periphery thereof. The internal bath 1A and the bottom portion of the overflow bath 1B are connected to each other through a circulation passage having a circulation pump 2, a filtration filter 3 and a line heater 4.

Etching solution within the etching bath 1 is controlled at 150 to 175° C. by the heater 1H and etching solution overflowing into the overflow bath 1B is sent by pressurization by the circulation pump 2 and deprived of foreign matter such as dust by the filtration filter 3. After that, the solution is reheated to the aforementioned temperature by a line heater 4 and returned to the internal bath 1A. Silicon wafers W dipped in the etching bath 1 are processed by etching solution whose temperature is controlled and from which foreign matter is removed so as to carry out etching treatment of removing silicon nitride selectively from the silicon wafer W on which the silicon nitride film and silicon oxide film are formed.

If the aforementioned etching treatment is repeated, silicon compound is generated in etching solution by the etching treatment of silicon nitride film and accumulated gradually so that concentration of silicon compound in phosphoric acid aqueous solution is increased. Consequently, silicon compound is precipitated into phosphoric acid solution so as to turn to foreign matter and causes clogging of the filtration filter 3 in the circulation passage. By change in concentration of silicon compound in phosphoric acid aqueous solution, etching selectivity expressed by a ratio of etching amount per unit time of each of silicon nitride film and silicon oxide film of each treatment lot is changed, so that etching treatment on plural processing lots with a constant selectivity is disabled.

To solve this problem, according to the conventional art shown in FIG. 1, another circulation passage branching from the aforementioned main circulation passage is formed and a removing device 5 for removing silicon compound generated in etching solution by forced precipitation is connected to this circulation passage. Consequently, this can inhibit increase of the concentration of silicon compound in etching solution circulated during etching treatment to some extent.

According to such a conventional art, although increase of silicon compound in etching solution can be suppressed to some extent, accumulation of silicon compound in etching solution step by step is unavoidable in a process of etching processing of a large amount of silicone wafer, because the conventional art cannot remove silicon compound in a high removal rate. Therefore, the conventional art cannot help replacing the etching solution with new phosphoric acid aqueous solution periodically, finally. As a result, an increase of processing cost due to utilization of the new phosphoric acid aqueous solution is problematic and further, treatment of waste etching solution which is industrial waste is also problematic.

As another conventional art, inclusion of a process of mixing hydrofluoric acid or ultra-pure water in waste etching solution in the phosphoric acid aqueous solution reproduction process has been proposed. Although removal of hydrofluoric acid is extremely important because remaining hydrofluoric acid accelerates etching of silicon oxide film, it is extremely difficult to remove hydrofluoric acid from waste etching solution and verify to what extent the hydrofluoric acid is removed. Further, although ultra-pure water is an indispensable component for etching treatment process of silicon nitride film, the quantity of ultra-pure water mixed is increased. As a result, excessive ultra-pure water needs to be removed before the etching solution is recycled, thereby producing an energy loss, which is a problem.

On the other hand, just after etching solution is replaced with new phosphoric acid aqueous solution, an etching amount of silicon oxide film per unit time is increased by the new phosphoric acid aqueous solution. As a result, sometimes, etching treatment cannot be carried out based on a desired etching selectivity. To avoid this phenomenon, sometimes, dummy etching of dipping a dummy wafer in which silicone nitride film is generated in etching solution is intentionally carried out in order to raise the concentration of silicon compound in etching solution. Consequently, processing time is increased by the dummy etching whereby disabling high productivity etching treatment.

Although to avoid the dummy etching, it has been considered to discharge part of waste etching solution while measuring and adjusting the concentration of silicon compound and replenish a specified amount of new etching solution (for example, Japanese Patent Application Laid-Open No. 2001-23952), such a fundamental problem that treatment cost is increased by adding new etching solution and waste etching solution as industrial waste needs to be disposed has not been solved and it has been desired to adjust the concentration of silicon compound of etching solution by carrying out waste etching solution treatment which does not affect natural environment badly.

SUMMARY OF THE INVENTION

The present invention intends to cope with these problems and objects of the invention are to enable waste etching solution to be recycled easily by removing silicon compound from the waste etching solution at a high removal rate; achieve a high productivity etching treatment by minimizing a stop time of an etching apparatus in which reproduced etching solution obtained by removing the silicon compound from the waste etching solution at a high removal rate and circulating the obtained etching solution; achieve uniform treatment based on a constant etching selectivity at the time of treatment by a large quantity; and enable the concentration of silicon compound of etching solution to be adjusted arbitrarily by the treatment of waste etching solution which does not affect natural environment badly.

To achieve these objects, the etching solution reproducing apparatus and etching solution reproduction method of the present invention have at least a configuration of following respective independent claims.

According to an aspect of the present invention, there is provided an etching solution reproducing apparatus which includes: temperature adjusting means for adjusting the temperature of taken out waste etching solution; atomizing means for atomizing waste etching solution adjusted in temperature by the temperature adjusting means; precipitating means for collecting waste etching solution atomized by the atomizing means and precipitating silicon compound in the waste etching solution; and separating means for separating silicon compound precipitated from the waste etching solution by the precipitating means so as to obtain reproduced etching solution.

According to another aspect of the present invention, there is provided an etching solution reproduction method which includes: temperature adjusting step of adjusting the temperature of taken out waste etching solution; atomizing step of atomizing waste etching solution adjusted in temperature by the temperature adjusting step; precipitating step of collecting waste etching solution atomized by the atomizing step and precipitating silicon compound in the waste etching solution; and separating step of separating silicon compound precipitated from the waste etching solution by the precipitating step so as to obtain reproduced etching solution.

DESCRIPTION OF THE PREFERRED EMBODIMENTS

Figure 2:
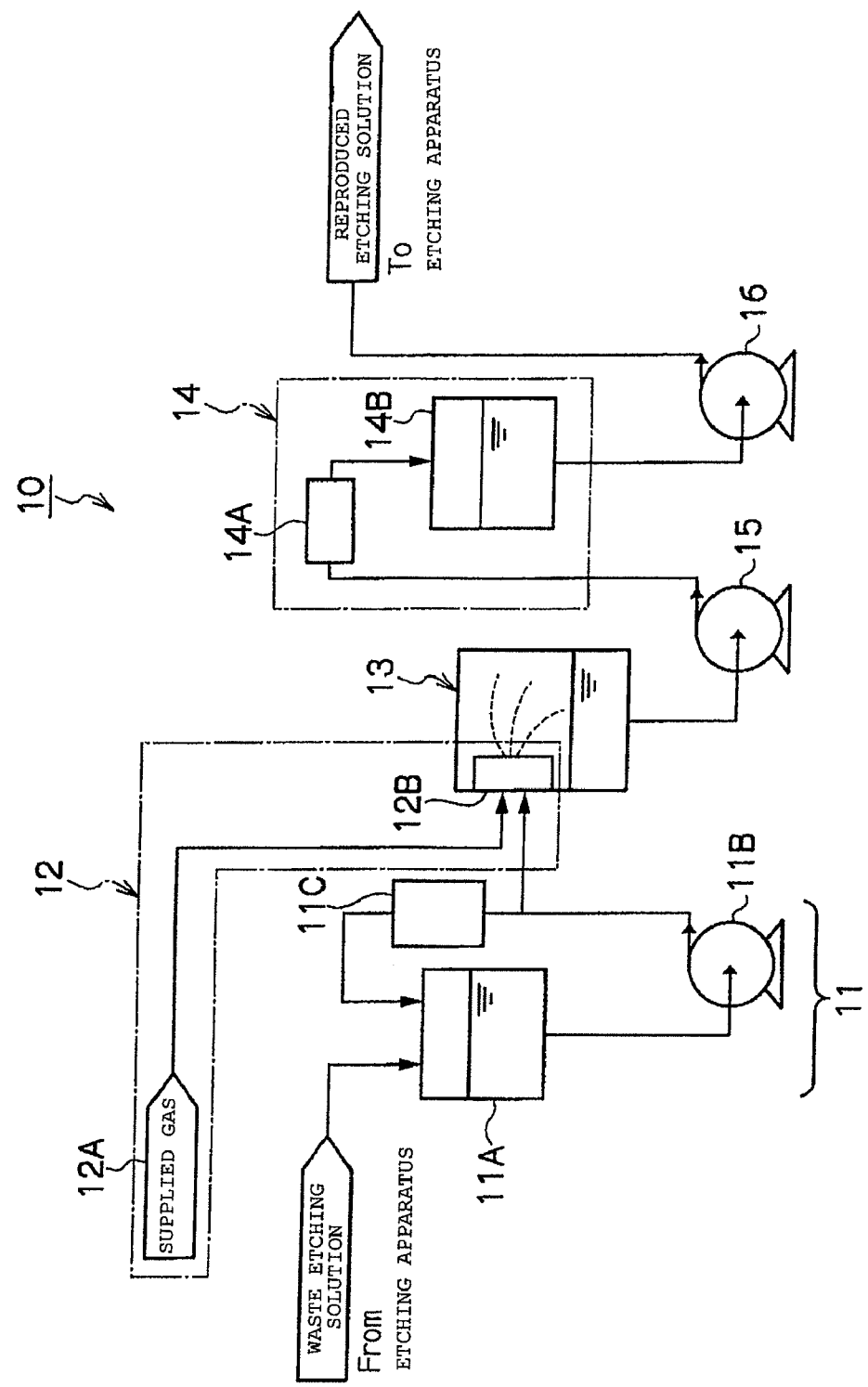
FIG. 2 is an explanatory diagram showing an example of an etching solution reproducing apparatus according to an embodiment of the present invention.

Hereinafter, the embodiment of the present invention will be described with reference to the accompanying drawings. FIG. 2 is an explanatory diagram showing an example of an etching solution reproducing apparatus according to an embodiment of the present invention. An etching solution reproducing apparatus 10 includes temperature adjusting means 11 for adjusting the temperature of waste etching solution taken out, atomizing means 12 for atomizing waste etching solution whose temperature is adjusted by the temperature adjusting means 11, precipitating means 13 for collecting waste etching solution atomized by the atomizing means 12 and precipitating silicon compound in the waste etching solution and separating means 14 for separating silicon compound precipitated from the waste etching solution by the precipitating means 13 so as to obtain reproduced etching solution.

The temperature adjusting means 11 includes a tank 11A for storing waste etching solution taken out from the etching apparatus, a circulation/pressure feed pump 11B connected to the bottom portion of the tank 11A and a temperature adjusting unit (heating unit) 11C. Waste etching solution stored in the tank 11A is sent to the temperature adjusting unit 11C by the circulation/pressure feed pump 11B and returned to the tank 11A through the temperature adjusting unit 11C. The temperature of the waste etching solution is adjusted to a constant temperature suitable for atomization and precipitation while this circulation is repeated.

The atomizing means 12 atomizes waste etching solution taken out partially from a circulation passage of the temperature adjusting means 11, its temperature being adjusted and in the indicated example, is comprised of a gas supplying portion 12A and a spray portion 12B. The spray portion 12B mixes gas supplied from the gas supplying means 12A at a set flow rate with waste etching solution taken out partially from the temperature adjusting means 11 and then sprays atomized waste etching solution. Here, the type of supplied gas is not limited to any particular one but dry gas and decontaminated clean gas are suitable, for example, nitrogen gas $N_2$ and oxygen gas $O_2$ are suitable. The spray portion 12B can be constituted of a spray nozzle having various structures and atomizes waste etching solution by mixing with supplied gas. A state of atomization (miniaturized state) is determined by the flow rate of the supplied gas and the flow rate of the waste etching solution (discharge amount of the circulation/pressure feed pump 11B).

The precipitating means (precipitating tank) 13 is a tank for collecting atomized waste etching solution. The atomized waste etching solution is crystallized in the form of silicon compound at a high probability and precipitated within the tank. Assuming that waste etching solution is phosphoric acid aqueous solution having a high concentration of silicon compound, water content in the waste etching solution is evaporated in a process of atomization so that the concentration of silicon compound melted in waste etching solution is raised and exceeds its solubility and consequently, crystal of the silicon compound can be precipitated effectively.

The separating means 14 is comprised of a separating device 14A such as a filter and a separating tank 14B. Waste etching solution within the precipitating means 13 is sent to the separating device 14A by a pump 15, in which crystallized and precipitated silicon compound and reproduced etching solution (phosphoric acid aqueous solution) deprived of the silicon compound are separated and then, silicon compound is removed at a high removal rate while reproduced etching solution having a low silicon compound concentration is collected in the separating tank 14B. The reproduced etching solution collected in the separating tank 14B is supplied to an etching device and the like by a pump 16 depending on a necessity.

In the etching solution reproducing apparatus 10, atomization is carried out under a specified temperature condition by combining the temperature adjusting means 11 and the atomizing means 12 effectively so as to crystallize and precipitate most of silicon compound. As an example, waste etching solution was adjusted in temperature to 50° C. by the temperature adjusting means 11 using phosphoric acid aqueous solution ($H_3PO_4+H_2O$) and after that, nitrogen gas $N_2$ was supplied by the atomizing means 12 with its supply amount set to 60 Nl/min and the supply amount of waste etching solution was adjusted to 200 cc/min. Consequently, reproduced etching solution whose silicon compound concentration was reduced by 90% or more could be generated (Table 1 below indicates a treatment result of the example).

|  | Before treatment | After treatment |
| --- | --- | --- |
| Silicon concentration (measured: ICP-AES) | 118 ppm | 9 ppm |

Figure 3:
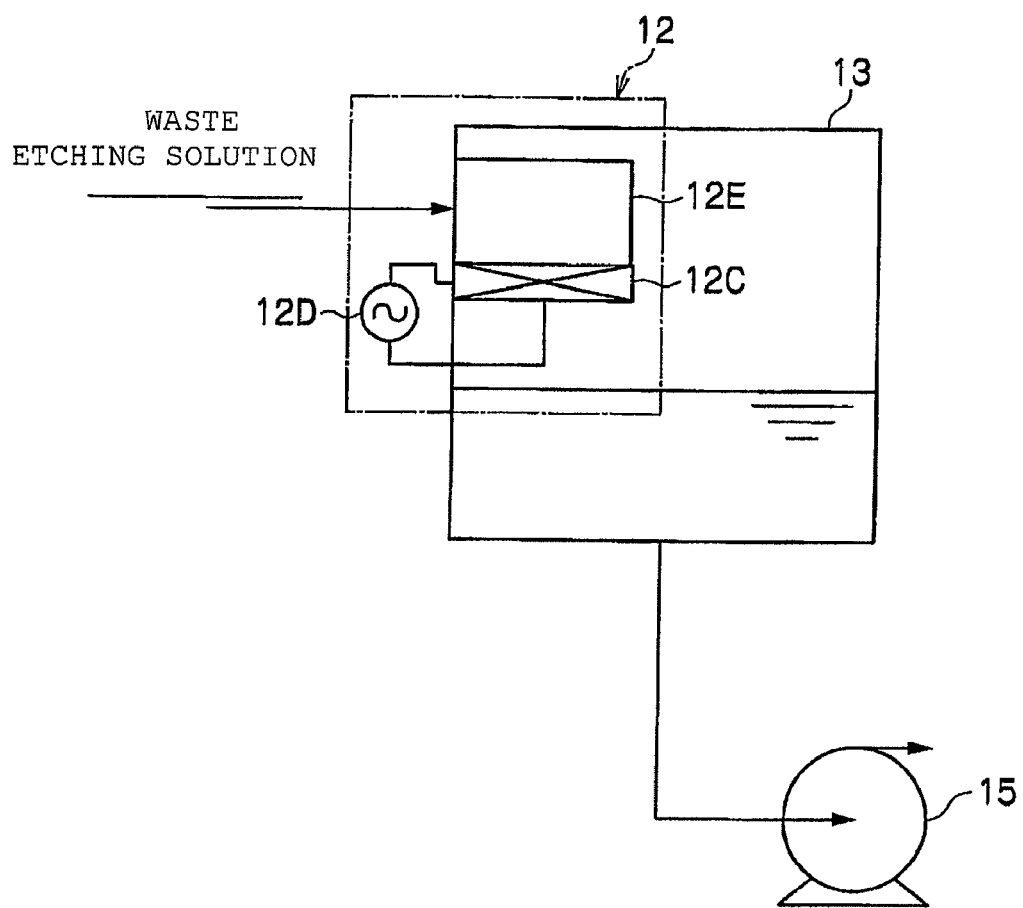
FIG. 3 is an explanatory diagram showing another embodiment of the present invention.

FIG. 3 is an explanatory diagram showing other embodiment of the present invention. This embodiment includes an ultrasonic atomizing portion (12C to 12E) which atomizes waste etching solution by applying ultrasonic vibration thereto. This ultrasonic atomizing portion includes an ultrasonic vibrator 12C, a drive source 12D which drives it and a waste etching solution supplying portion 12E. When waste etching solution supplied from the temperature adjusting means 11 is supplied to the waste etching solution supplying portion 12E, ultrasonic vibration is applied to that waste etching solution by the ultrasonic vibrator 12C to atomize the waste etching solution. The atomized waste etching solution is collected by the precipitating tank 13 like the above-described embodiment and sent to the separating means 14 by the pump 15.

According to this embodiment, atomization to fine particles using the ultrasonic vibration can be achieved so that silicon compound can be crystallized and precipitated from the waste etching solution effectively. Further, because the driving frequency of the drive source 12D can be changed appropriately, optimum atomized state can be obtained by adjusting the driving frequency.

Figure 4:
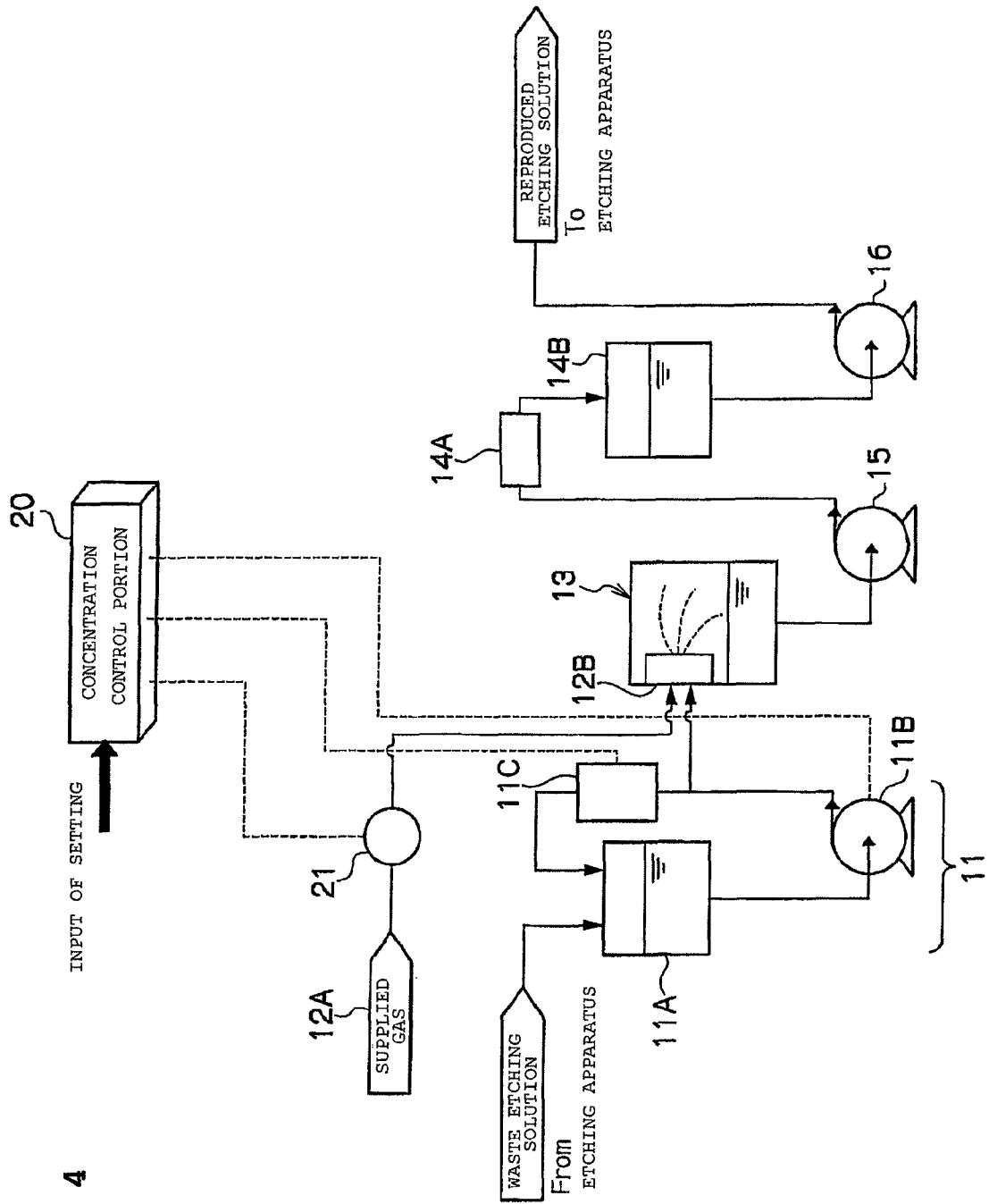
FIG. 4 is an explanatory diagram showing still another embodiment of the present invention.

FIG. 4 is an explanatory diagram showing other embodiment of the present invention (while like reference numerals are attached to the same components as the embodiment shown in FIG. 2, duplicated description thereof is omitted partially). This embodiment includes a concentration control portion 20. This concentration control portion 20 can control the temperature adjusting unit 11C, the circulation/pressure feed pump 11B and a gas supply adjusting portion 21 for adjusting the supply velocity of the gas supplying portion 12A depending on a set input.

Consequently, adjusted temperature of the temperature adjusting means 11 can be controlled by controlling the temperature adjusting unit 11C of the temperature adjusting means 11 and atomization of the atomizing means 12 can be controlled by the circulation/pressure feed pump 11B or the gas supply adjusting portion 21. Consequently, the concentration of silicon compound in reproduced etching solution can be controlled by controlling any one or both of them.

The atomization state of the atomizing means 12 includes control on miniaturization of fog and can be controlled by the amount of flow rate of gas supplied to the spray portion 12B. In the embodiment shown in FIG. 3, it can be controlled depending on vibration frequency of the ultrasonic atomizing portion (12C to 12E).

According to such an embodiment, the concentration of silicon compound in the reproduced etching solution can be controlled arbitrarily by inputting a setting to the concentration control portion 20. By the control of the silicon compound concentration, the concentration of silicon compound can be adjusted arbitrarily without addition of new etching solution or disposing part of the waste etching solution.

The etching solution reproduction method using the etching solution reproducing apparatus according to the embodiment of the present invention includes temperature adjusting step of adjusting the temperature of taken out waste etching solution, atomizing step of atomizing waste etching solution whose temperature is adjusted by this temperature adjusting step, precipitation step of collecting waste etching solution atomized by this atomizing step and precipitating silicon compound in the waste etching solution and separating step of obtaining reproduced etching solution by separating silicon compound precipitated from waste etching solution by the precipitating step.

If the aforementioned concentration control portion 20 is provided, concentration control step of controlling the concentration of silicon compound of reproduced etching solution by controlling any one or both of the adjusted temperature of the temperature adjusting step and atomization state of the atomizing step is further provided.

An operation of this embodiment will be described about a case of etching a silicon wafer in which silicon nitride film and silicon oxide film are formed using phosphoric acid aqueous solution as etching solution.

Figure 1:
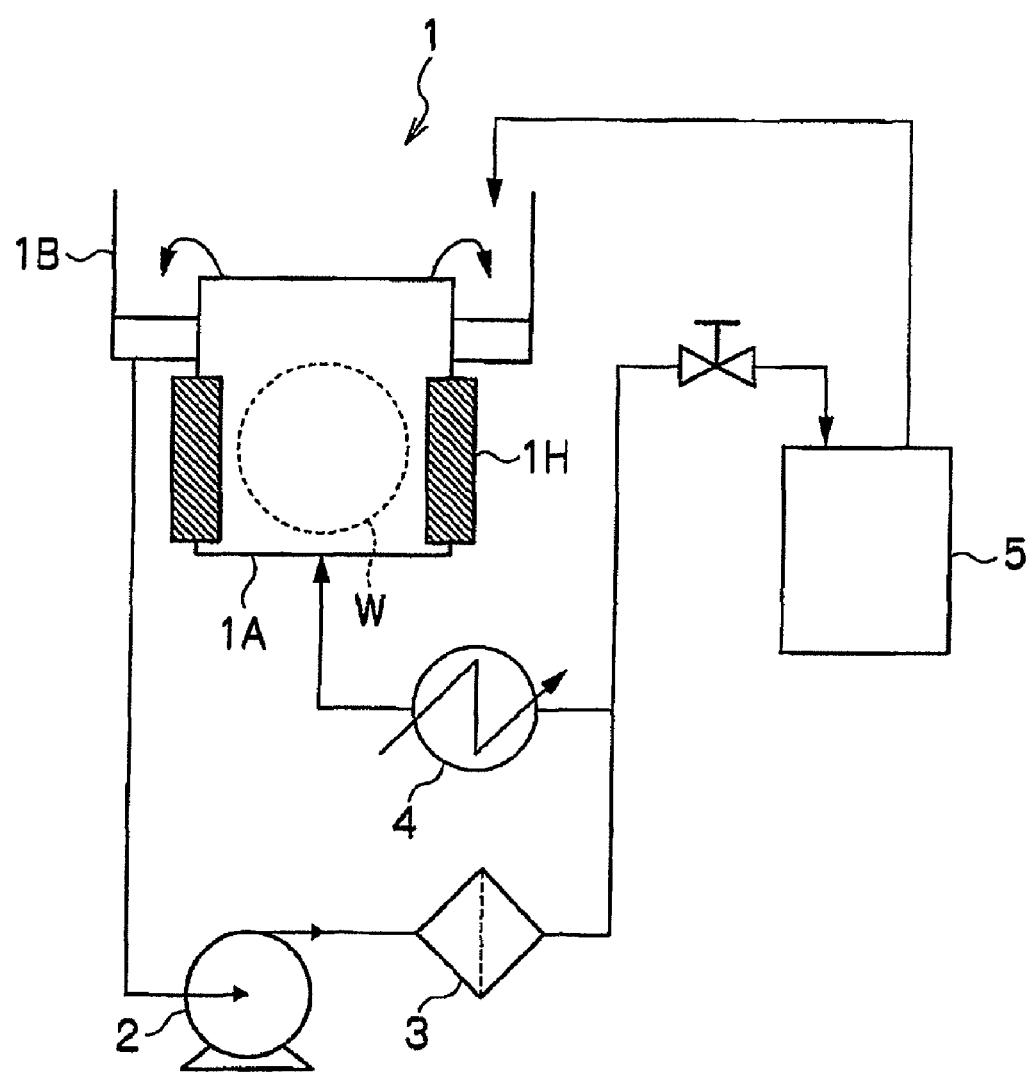
FIG. 1 is an explanatory diagram showing a conventional art of an etching apparatus.

If a circulation passage of the aforementioned etching apparatus is incorporated in the etching solution reproducing apparatus 10, silicon compound dissolved in phosphoric acid aqueous solution by etching treatment can be removed from the phosphoric acid aqueous solution easily at a high accuracy. Therefore, if such an etching solution reproducing apparatus is applied to the etching apparatus shown in FIG. 1, the filtration filter 3 is never clogged and the etching apparatus can be operated continuously to a large quantity of continuous processing, thereby improving working efficiency of the etching apparatus.

By incorporating the etching solution reproducing apparatus in the circulation passage, the concentration of silicon compound of phosphoric acid aqueous solution at the time of etching treatment can be maintained to a constant level and a large quantity of lots can be etched continuously under a specified etching selectivity. Therefore, highly uniform etching treatment can be continued for a large number of lots.

Further, because reproduction to high purity phosphoric acid aqueous solution can be carried out during etching treatment, replacement work of new phosphoric acid aqueous solution can be reduced and a stop time of the etching apparatus can be reduced, thereby achieving high productivity etching treatment. Particularly, because disposal of waste etching solution is reduced by recycling of waste etching solution, it is favorable in viewpoints of natural environment protection and because replacement to new etching solution is not frequent, economic and advantageous work can be achieved.

If waste etching solution is reproduced by batch processing according to the embodiment of the present invention, the reproduced etching solution optimized in silicon compound concentration can be generated by control of the aforementioned concentration control portion 20. Consequently, the etching treatment can be carried out from the beginning with a desired etching selectivity without any dummy etching, effective etching procedure can be achieved.

What is claimed is:

1. An etching solution reproducing apparatus comprising:
   a temperature adjuster that adjusts the temperature of taken out waste etching solution;
   an atomizer that atomizes waste etching solution adjusted in temperature by the temperature adjuster;
   a precipitator that collects waste etching solution atomized by the atomizer and precipitating silicon compound in the waste etching solution in a precipitating tank; and
   a separator that separates silicon compound precipitated from the waste etching solution by the precipitator so as to obtain reproduced etching solution,
   wherein atomizer has a spraying portion which mixes gas supplied at a set flow rate with waste etching solution and sprays atomized waste etching solution, and wherein the temperature adjuster has a circulation passage to adjust the temperature of the waste etching solution while circulation of the waste etching solution is repeated, and the spraying portion mixes the gas supplied with waste etching solution taken out partially from the circulation passage and sprays the atomized waste etching solution in the precipitator tank.

2. The etching solution reproducing apparatus according to claim 1, further comprising a concentration control portion which controls the concentration of silicon compound of the reproduced etching solution by controlling any one or both of adjusted temperature of the temperature adjuster and atomized state of the atomizer.

3. The etching solution reproducing apparatus according to claim 1, wherein a concentration control portion which controls the concentration of silicon compound of the reproduced etching solution by controlling any one or both of adjusted temperature of the temperature adjuster and atomized state of the atomizer is provided and the atomized state of the atomizer is controlled by a flow rate of gas supplied to the spraying portion.

4. An etching solution reproducing apparatus comprising:
   a temperature adjuster that adjusts the temperature of taken out waste etching solution;
   an atomizer that atomizes waste etching solution adjusted in temperature by the temperature adjuster;
   a precipitator that collects waste etching solution atomized by the atomizer and precipitating silicon compound in the waste etching solution in a precipitating tank; and
   a separator that separates silicon compound precipitated from the waste etching solution by the precipitator so as to obtain reproduced etching solution,
   wherein the temperature adjuster has a circulation passage to adjust the temperature of the waste etching solution while circulation of the waste etching solution is repeated, and the spraying portion mixes the gas supplied with waste etching solution taken out partially from the circulation passage and sprays the atomized waste etching solution in the precipitator tank, and
   wherein an ultrasonic atomizing portion atomizes the waste etching solution by applying ultrasonic vibration thereto.

5. The etching solution reproducing apparatus according to claim 4, wherein a concentration control portion which controls the concentration of silicon compound of the reproduced etching solution by controlling any one or both of adjusted temperature of the temperature adjuster and atomized state of the atomizer is provided and the atomized state of the atomizer is controlled by vibration frequency of the ultrasonic atomizing portion.

* * * * *